(12) United States Patent
Imazato et al.

(10) Patent No.: US 10,660,398 B2
(45) Date of Patent: May 26, 2020

(54) RUBBER MEMBER FOR LASER BONDING AND SHOE

(75) Inventors: Katsuhiro Imazato, Kobe (JP); Hironori Kitayama, Kobe (JP); Junichiro Tateishi, Kobe (JP); Sadaki Mori, Kobe (JP)

(73) Assignee: ASICS CORPORATION (JP)

( * ) Notice: Subject to any disclaimer, the term of this patent is extended or adjusted under 35 U.S.C. 154(b) by 718 days.

(21) Appl. No.: 13/502,125

(22) PCT Filed: Oct. 15, 2009

(86) PCT No.: PCT/JP2009/067831
§ 371 (c)(1),
(2), (4) Date: Apr. 13, 2012

(87) PCT Pub. No.: WO2011/045855
PCT Pub. Date: Apr. 21, 2011

(65) Prior Publication Data
US 2012/0198722 A1    Aug. 9, 2012

(51) Int. Cl.
| | |
|---|---|
| A43B 1/10 | (2006.01) |
| C08K 3/36 | (2006.01) |
| C08K 3/22 | (2006.01) |
| A43B 13/12 | (2006.01) |
| A43B 13/04 | (2006.01) |
| C09J 121/00 | (2006.01) |
| B29C 65/00 | (2006.01) |
| B29C 65/16 | (2006.01) |
| B29C 65/50 | (2006.01) |
| A43D 86/00 | (2006.01) |
| C08L 9/00 | (2006.01) |
| A43D 25/06 | (2006.01) |
| C08L 23/08 | (2006.01) |
| B29K 509/08 | (2006.01) |
| B29L 31/50 | (2006.01) |
| B29C 65/48 | (2006.01) |

(52) U.S. Cl.
CPC ............. *A43B 13/12* (2013.01); *A43B 13/04* (2013.01); *A43D 25/06* (2013.01); *A43D 86/00* (2013.01); *B29C 65/168* (2013.01); *B29C 65/1616* (2013.01); *B29C 65/1635* (2013.01); *B29C 65/5057* (2013.01); *B29C 66/45* (2013.01); *B29C 66/71* (2013.01); *C08K 3/36* (2013.01); *C08L 9/00* (2013.01); *C09J 121/00* (2013.01); *B29C 65/1664* (2013.01); *B29C 65/1674* (2013.01); *B29C 65/4815* (2013.01); *B29C 66/712* (2013.01); *B29C 66/919* (2013.01); *B29C 66/9161* (2013.01); *B29C 66/934* (2013.01); *B29C 66/939* (2013.01); *B29K 2509/08* (2013.01); *B29L 2031/50* (2013.01); *C08L 23/0853* (2013.01)

(58) Field of Classification Search
CPC ............... A43B 1/10; C08K 3/22; C08K 3/26
USPC ..................... 36/84; 524/493, 432
See application file for complete search history.

(56) References Cited

U.S. PATENT DOCUMENTS

| | | | |
|---|---|---|---|
| 3,873,489 A * | 3/1975 | Thurn | B82Y 30/00 152/450 |
| 4,474,908 A * | 10/1984 | Wagner | 523/213 |
| 7,543,399 B2 | 6/2009 | Kilgore et al. | |
| 2001/0024717 A1* | 9/2001 | Sugimoto | B29C 41/18 428/318.4 |
| 2005/0170180 A1* | 8/2005 | Kawa | 428/402 |
| 2005/0203225 A1* | 9/2005 | Nakagawa | B29C 65/1635 524/190 |
| 2007/0056684 A1 | 3/2007 | Yamamoto et al. | |

(Continued)

FOREIGN PATENT DOCUMENTS

| | | | |
|---|---|---|---|
| EP | 2184318 | * | 10/2009 |
| JP | 2002-309221 A | | 10/2002 |

(Continued)

OTHER PUBLICATIONS

White, James L. Kim, Kwang-Jea. (2008). Thermoplastic and Rubber Compounds—Technology and Physical Chemistry. Hanser Publishers, pp. 31-33, Section 1.4 Particle Fillers and Reinforcements.*

(Continued)

*Primary Examiner* — Deve V Hall
(74) *Attorney, Agent, or Firm* — Katten Muchin Rosenman LLP (57) ABSTRACT

A rubber member for laser bonding of the present invention containing a rubber ingredient and silica, wherein the silica has an average particle size of more than 50 nm and 120 nm or less, and the amount of the silica is 10 parts by mass to 50 parts by mass based on 100 parts by mass of the rubber ingredient, the rubber member has a laser light transmittance of 30% or more, provided that the laser light transmittance is a transmittance when the rubber member has a thickness of 2 mm and is irradiated with laser light having a wavelength of 808 nm. The silica preferably includes silica having an average particle size of more than 50 nm and 120 nm or less and silica having an average particle size of 5 nm to 50 nm, and the amount of the silica having an average particle size of more than 50 nm and 120 nm or less is 10 parts by mass to 50 parts by mass based on 100 parts by mass of the rubber ingredient and the amount of the silica having an average particle size of 5 nm to 50 nm is 10 parts by mass to 50 parts by mass based on 100 parts by mass of the rubber ingredient.

5 Claims, 2 Drawing Sheets

(56) References Cited

U.S. PATENT DOCUMENTS

| | | | |
|---|---|---|---|
| 2007/0142529 A1* | 6/2007 | Uesaka | C08K 3/22 524/430 |
| 2009/0130451 A1* | 5/2009 | Farrell | 428/411.1 |
| 2009/0239965 A1 | 9/2009 | Wada et al. | |
| 2011/0300373 A1 | 12/2011 | Motoshige et al. | |
| 2012/0204446 A1 | 8/2012 | Tateishi et al. | |

FOREIGN PATENT DOCUMENTS

| | | | |
|---|---|---|---|
| JP | 2003-070503 A | | 3/2003 |
| JP | 2004-262961 A | | 9/2004 |
| JP | 2004-329518 A | | 11/2004 |
| JP | 2005-290087 A | | 10/2005 |
| JP | 2006-265545 A | | 10/2006 |
| JP | 2007-258508 A | | 10/2007 |
| JP | 2007-320995 A | | 12/2007 |
| JP | 2008-007584 A | | 1/2008 |
| JP | 2008-519651 A | | 6/2008 |
| JP | 2006-257441 | * | 9/2008 |
| JP | 2008-208247 A | | 9/2008 |
| JP | 2008-260907 A | | 10/2008 |
| JP | 2009-155402 A | | 7/2009 |
| WO | WO-2005/021244 A1 | | 3/2005 |
| WO | WO-2008013060 A1 | | 1/2008 |

OTHER PUBLICATIONS

Japanese Office Action and partial English language translation for Japanese Patent application No. 2011-543904.

Extended European Search Report containing Supplementary European Search Report and the European Search Opinion, Application No. EP 09850397.2 [PCT/JP/2009067831]. dated Feb. 14, 2013.

Chinese Office Action and Partial English Translation for Chinese Patent Application No. 200980161942.5, dated Jan. 6, 2014.

European Office Action for European Patent Application No. 09850397. 2, dated Feb. 13, 2014.

Japanese Office Action and partial English translation for Japanese Patent application No. JP2011-543904.

* cited by examiner

LASER

RUBBER MEMBER FOR LASER BONDING AND SHOE

CROSS-REFERENCE TO RELATED APPLICATIONS

This application is a U.S. national phase application under 37 U.S.C. § 371 of Patent Cooperation Treaty Application No. PCT/JP2009/067831 filed on Oct. 15, 2009. The disclosure of each application listed in this paragraph is incorporated by reference herein in its entirety.

TECHNICAL FIELD

The present invention relates to a rubber member for laser bonding which has an excellent transparency to laser light, and a shoe having the rubber member.

A shoe is produced by bonding an each component such as an outersole and a midsole.

Traditionally, bonding of the aforementioned components has been performed by using a solvent adhesive or a hot-melt adhesive.

However, a bonding method using the solvent adhesive requires a step of coating the adhesive and a step of volatilizing a solvent, and therefore takes long time. Further, components of a shoe may have a complicatedly shaped bonding surface. Such a complicatedly shaped bonding surface cannot be coated with the solvent adhesive by using a machine, and reliance must be placed upon hand work to coat the adhesive. Therefore, uneven bonding between members likely occurs due to human errors.

A bonding method using the hot-melt adhesive does not cause volatilization of a solvent, and is therefore preferable from an environmental viewpoint. However, the hot-melt adhesive generally has a high viscosity and is therefore hard to be coated. Particularly, it is difficult to uniformly coat the complicatedly shaped bonding surface with the hot-melt adhesive.

On the other hand, bonding methods using laser light are known. A laser bonding method does not have disadvantages associated with the bonding methods using the solvent adhesive and the hot-melt adhesive. Thus, it is considered that a bonding method using laser light is used in production of a shoe.

The bonding method using laser light is a method in which two adherends are laminated, or two adherends are laminated with a melt adhesive sheet interposed therebetween, and the laminate is irradiated with laser light to bond the interfaces of two adherends together. In this case, one adherend is formed of a material which can transmit laser light, and the other adherend or the melt adhesive sheet is formed of a material which can be melted by absorbing laser light.

As the material which can transmit laser light (one adherend described above), a thermoplastic resin containing a rubber reinforced resin obtained by polymerizing a vinyl monomer in the presence of a rubber polymer is known (Patent Document 1: Japanese Unexamined Patent Publication No. 2004-262961). In the thermoplastic resin of Patent Document 1, the transmittance of laser light having a wavelength of 808 nm (transmittance of laser light when the resin is molded into a thickness of 4 mm) is 5% or more. More specifically, the laser light transmittance of a molded product (rubber member) obtained by molding the thermoplastic resin containing the rubber reinforced resin is 10 to 32% (Table 2 of Patent Document 1).

However, in the rubber member of Patent Document 1, the laser light transmittance is relatively low, and therefore there arises a disadvantage that an adhesive failure occurs or an extended period of time is required for bonding.

The rubber member must have a mechanical strength. Particularly, the rubber member used as a component of a shoe must have an excellent mechanical strength.

Patent Document 1: Japanese Unexamined Patent Publication No. 2004-262961

SUMMARY OF INVENTION

The object of the present invention is to provide a rubber member for laser bonding which has an excellent transparency to laser light and further an excellent mechanical strength, and a shoe having the rubber member.

As described above, for bonding a rubber member to an adherend in short time and in good condition using laser light, the rubber member must sufficiently transmit laser light.

On the other hand, for obtaining a rubber member having an excellent mechanical strength, silica is preferably blended as a filler. The present inventors have found that silica having a predetermined average particle size becomes a factor that hinders transmission of laser light, and consequently completed the present invention.

The first rubber member for laser bonding of the present invention contains a rubber ingredient and silica. The silica has an average particle size of 5 nm to 50 nm, the amount of the silica is 10 parts by mass to 100 parts by mass based on 100 parts by mass of the rubber ingredient, and the rubber member has a laser light transmittance of 30% or more. The laser light transmittance is a transmittance when the rubber member has a thickness of 2 mm and is irradiated with laser light having a wavelength of 808 nm.

The second rubber member for laser bonding of the present invention contains a rubber ingredient and silica. The silica has an average particle size of more than 50 nm and 120 nm or less, the amount of the silica is 10 parts by mass to 50 parts by mass based on 100 parts by mass of the rubber ingredient, and the rubber member has a laser light transmittance of 30% or more. The laser light transmittance is a transmittance when the rubber member has a thickness of 2 mm and is irradiated with laser light having a wavelength of 808 nm.

The third rubber member for laser bonding of the present invention contains a rubber ingredient and silica. The silica includes silica having an average particle size of more than 50 nm and 120 nm or less and silica having an average particle size of 5 nm to 50 nm, the amount of the silica having an average particle size of more than 50 nm and 120 nm or less is 10 parts by mass to 50 parts by mass based on 100 parts by mass of the rubber ingredient, and the amount of the silica having an average particle size of 5 nm to 50 nm is 10 parts by mass to 50 parts by mass based on 100 parts by mass of the rubber ingredient. The laser light transmittance is a transmittance when the rubber member has a thickness of 2 mm and is irradiated with laser light having a wavelength of 808 nm.

In a preferable rubber member for laser bonding of the present invention, refractive index of the silica is 1.5 or less.

In other preferable rubber member for laser bonding of the present invention, the rubber member further contains zinc oxide, and the amount of the zinc oxide is 3 parts by mass or less based on 100 parts by mass of the rubber ingredient.

In another aspect of the present invention, the present invention provides a shoe.

The shoe contains any one of the rubber members for laser bonding described above.

The rubber member for laser bonding of the present invention is excellent in laser light transmittance. By using this rubber member, laser light irradiation time which is required to bond the rubber member to an adherend can be relatively reduced. Furthermore, the rubber member of the present invention can be used as, for example, a component of a shoe since the rubber member is also excellent in mechanical strength.

DESCRIPTION OF EMBODIMENTS

The rubber member for laser bonding of the present invention contains a rubber ingredient and silica.

If the silica has an average particle size of 5 nm to 50 nm, the content of the silica is 10 parts by mass to 100 parts by mass based on 100 parts by mass of the rubber ingredient. If the silica has an average particle size of more than 50 nm and 120 nm or less, the content of the silica is 10 parts by mass to 50 parts by mass based on 100 parts by mass of the rubber ingredient. This rubber member for laser bonding has a laser light transmittance of 30% or more, when the rubber member has a thickness of 2 mm and is irradiated with laser light having a wavelength of 808 nm.

Hereinafter, "rubber member for laser bonding" may refer to as "rubber member".

The rubber ingredient is not particularly limited, and for example, a diene-based rubber and an non-diene-based rubber may be cited.

Examples of the diene-based rubber include synthetic rubbers such as butadiene rubber (BR), isoprene rubber (IR), chloroprene rubber (CR); natural rubbers (NR); copolymer rubbers such as styrene-butadiene rubber (SBR), styrene-butadiene-styrene rubber (SBSR), acrylonitrile-butadiene rubber (NBR), styrene-isoprene copolymer (SIR), butyl rubber (IIR); and the like.

Examples of the non-diene-based rubber include ethylene-α-olefin-based copolymer rubbers containing an ethylene unit and a unit consisting of an α-olefin having 3 or more carbon atoms; urethane-base rubbers; acryl-based rubbers; silicone-based rubbers; and the like.

The copolymer rubber may be a block copolymer or a random copolymer.

The diene-based rubber or the non-diene-based rubber may be used alone or in combination of two or more kinds.

The rubber ingredient of the present invention is preferably a diene-based rubber, more preferably at least one selected from the group consisting of a butadiene rubber, an isoprene rubber, a styrene-butadiene rubber, and a natural rubber. A rubber member containing such a rubber ingredient has excellent processing characteristics and crosslinking efficiency and is therefore preferable.

Silica is a filler for increasing the volume of the rubber member and reinforcing the rubber.

In the present invention, the silica having an average particle size of 5 nm to 120 nm is used. Specifically, the silica having an average particle size of 5 nm to 50 nm or/and the silica having an average particle size of more than 50 nm and 120 nm or less is(are) used. Hereinafter, in the present specification, "silica having an average particle size of 5 nm to 50 nm" may refer to as "first silica", and "silica having an average particle size of more than 50 nm and 120 nm or less" may refer to as "second silica".

The first silica preferably has average particle size of 10 nm to 50 nm, and more preferably has average particle size of 10 nm to 30 nm.

The second silica preferably has average particle size of more than 50 nm and 100 nm or less.

The average particle size of the silica may be measured by a method described in the following Examples.

The silica having the aforementioned average particle size can be obtained by a known preparation method. Examples of the preparation methods include, for example, a dry grinding method in which a jet mill or a ball mill is used to obtain silica having a desired average particle size; a wet grinding method in which a disper or homogenizer is used to obtain silica having a desired average particle size; and the like.

The content of silica is determined as appropriate depending on its average particle size.

The rubber member of the present invention may contain the first silica or the second silica alone, or may contain both the first silica and the second silica.

If the first silica is used alone, the content of the first silica is 10 parts by mass to 100 parts by mass, preferably 10 parts by mass to 80 parts by mass, and more preferably 10 parts by mass to 50 parts by mass based on 100 parts by mass of the rubber ingredient. If the content of the first silica is less than 10 parts by mass, a sufficient reinforcing effect cannot be imparted to the rubber member, and thus a rubber member having a poor mechanical strength may be obtained. On the other hand, if the content of the first silica is more than 100 parts by mass, a rubber member having a laser light transmittance of 30% may not be obtained.

If the second silica is used alone, the content of the second silica is 10 parts by mass to 50 parts by mass, preferably 10 parts by mass to 30 parts by mass, and more preferably 10 parts by mass to 20 parts by mass based on 100 parts by mass of the rubber ingredient. If the content of the second silica is less than 10 parts by mass, a sufficient reinforcing effect cannot be imparted to the rubber member, and thus a rubber member having an excellent mechanical strength may not be obtained. On the other hand, if the content of the second silica is more than 50 parts by mass, a rubber member having a laser light transmittance of 30% may not be obtained.

If the first silica and the second silica are used in combination, the content of the first silica is 10 parts by mass to 50 parts by mass, and preferably 10 parts by mass to 30 parts by mass based on 100 parts by mass of the rubber ingredient. On the other hand, the content of the second silica is 10 parts by mass to 50 parts by mass, and preferably 10 parts by mass to 30 parts by mass based on 100 parts by mass of the rubber ingredient.

The second silica having a large average particle size as compared to the first silica is expected to act to hinder transmission of laser light. However, addition of the first silica to the second silica improves transmission of laser light. Thus, if the second silica is used, the first silica is preferably used in combination.

Therefore, the rubber member of the present invention preferably contains at least the first silica (silica having an average particle size of 5 nm to 50 nm). The first silica is hard to reduce the laser light transmittance of the rubber member. Accordingly, the use of the first silica allows the content of silica to be increased as compared to the case where the second silica is used alone. By blending silica in a greater amount, a rubber member having a higher volume and an excellent mechanical strength can be obtained.

In the present invention, the use of silica whose refractive index is as low as possible is preferable. Specifically, the refractive index of the silica is preferably 1.5 or less, more preferably 1.2 to 1.5, and particularly preferably 1.4 to 1.5. The silica having a refractive index of more than 1.5 may reduce the laser light transmittance. On the other hand, the silica having a refractive index less than 1.2 is difficult to obtain in practice.

The refractive index of the silica may be measured by using an Abbe refractometer or the like.

For the silica, according to classification based on the method for production thereof, dry silica obtained by burning silicon tetrachloride in a oxyhydrogen flame; wet silica obtained by neutralizing an alkali silicate with an acid; sol-gel process silica obtained by hydrolyzing an alkoxide of silicon in an acidic or alkaline water-containing organic solvent; colloidal silica obtained by electrodialysis of an aqueous alkali silicate solution; and the like are known. In the present invention, these kinds of silica may be used alone or in combination of two or more kinds. Particularly, the dry silica is preferably used because it is hard to coagulate and has excellent dispersibility during processing.

The rubber member of the present invention may contain a filler other than the silica. Examples of the filler other than the silica include calcium carbonate, magnesium carbonate, magnesium oxide, titanium oxide, and the like. However, the titanium oxide has the property of markedly reflecting laser light. Therefore, the rubber member preferably does not contain the titanium oxide substantially. Alternatively, if the rubber member contains the titanium oxide, the content of the titanium oxide is preferably more than 0 and 0.1 part by mass or less based on 100 parts by mass of the rubber ingredient.

The rubber member of the present invention preferably does not contain carbon black as a filler substantially. The carbon black absorbs laser light, and therefore excessively reduces the transmittance of the rubber member. Furthermore, blending of the carbon black may induce heat generation in the rubber member during irradiation of laser light.

The rubber member of the present invention preferably contains a crosslinker. The rubber ingredient is crosslinked by the crosslinker, and a rubber member having a good elasticity can be obtained.

The crosslinker is not particularly limited, and examples thereof include compounds containing sulfur, organic peroxides, and the like. Examples of the compounds containing sulfur include sulfur, halogenated sulfur, di-2-benzothiazolyl disulfide, N-oxidiethylene-2-benzothiazolyl sulfeneamide, and the like. Examples of the organic peroxides include dicumyl peroxide, 2,5-dimethyl-2,5-di(t-butylperoxy)hexane, 1,1-di(t-butylperoxy) cyclohexane, and the like.

The content of the crosslinker is preferably 0.5 part by mass to 10 parts by mass, and more preferably 0.5 part by mass to 5 parts by mass based on 100 parts by mass of the rubber ingredient.

Further, for promoting crosslinking by the crosslinker, the rubber member may contain a crosslinking promoter. Examples of the crosslinking promoters include zinc oxide, oxides of metals other than zinc, metal hydroxides, fatty acids, and the like. Examples of the oxides of metals other than zinc include magnesium oxide, lead monoxide, and the like. Examples of the metal hydroxides include calcium hydroxide and the like. Examples of the fatty acids include stearic acid, oleic acid, and the like. The zinc oxide is preferably used because of the excellent crosslinking promoting effect.

If the zinc oxide is used as a crosslinker, the content of the zinc oxide is preferably more than 0 and 3 parts by mass or less, and more preferably more than 0 and 1 part by mass or less based on 100 parts by mass of the rubber ingredient. The rubber member, in which more than 3 parts by mass of the zinc oxide is blended, may have a laser light transmittance of less than 30%.

The rubber member of the present invention may contain a silane coupling agent. Examples of the silane coupling agent include epoxy-based silane coupling agents, polysulfide-based silane coupling agents, amino-based silane coupling agents, and the like. The rubber member preferably contains the amino-based silane coupling agent because adhesiveness between the adherend and the rubber member can be increased.

The rubber member may contain an other additive within the range not impairing the effect of the present invention. Examples of the other additive include weathering agents, antioxidants, ultraviolet absorbers, lubricants, antistatic agents, dispersants, and the like.

The rubber member of the present invention may be obtained by mixing each ingredients described above and molding the mixture thereof. The temperature at which the ingredients are mixed is usually 100° C. or less, preferably 80° C. or less. Mixing at a too high temperature may cause crosslinking of a rubber ingredient contained in the mixture. Mixing may be carried out using a Banbury mixer, a kneader, a twin-screw extruder, or the like.

Molding of the mixture is carried out by placing the mixture in an appropriate mold and heating the same. By heating, the rubber ingredient is crosslinked by a crosslinker to obtain a rubber member having a rubber elasticity.

The temperature at which the mixture is molded is preferably 120° C. to 200° C., more preferably 120° C. to 180° C.

The rubber member of the present invention is not limited to a particular usage, but is used for any suitable application arbitrary. The rubber member of the present invention can be formed into an appropriate flat shape or three-dimensional shape and thickness depending on its application.

The rubber member of the present invention is excellent in mechanical strength, and can be suitably used as a component of a product that can be used under a severe environment. A preferable application of such a rubber member is a component of a shoe. Examples of the component of the shoe include outersoles, midsoles, innersoles, heel counters, and the like and preferable is the outersole. The outersole is a component that normally contacts the ground, but also includes a component that is placed on a part which does not contact the ground (arch of a foot).

The rubber member of the present invention may be bonded to an arbitrary adherend by using laser light.

Figure 1:
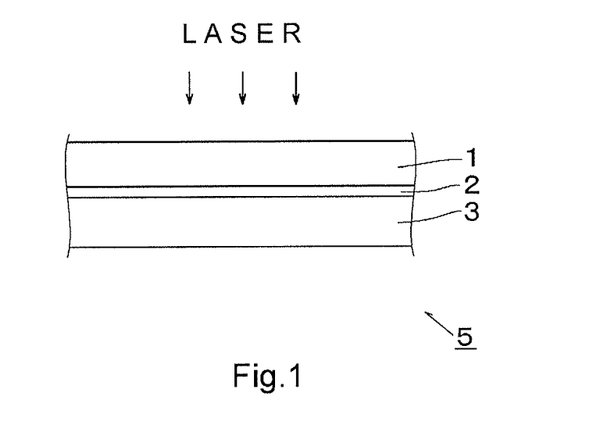
FIG. 1 is a side view of a laminate which containing a rubber member for laser bonding and an adherend.

FIG. 1 shows a laminate 5 in which a rubber member 1 of the present invention, a melt adhesive sheet 2, and an adherend 3 are laminated in this order.

By irradiation of laser light from the rubber member 1 side, the layers 1, 2, and 3 of the laminate 5 are bonded. That is, the melt adhesive sheet 2 generates heat and is melted by laser light, and the rubber member 1 and the adherend 3 are strongly bonded together with the molten sheet 2 interposed therebetween.

Figure 2:
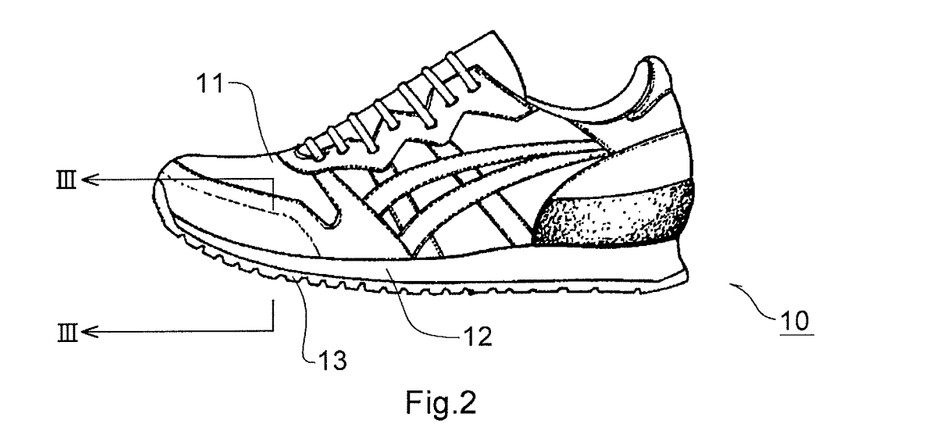
FIG. 2 is a side view of one embodiment of a shoe.
Figure 3:
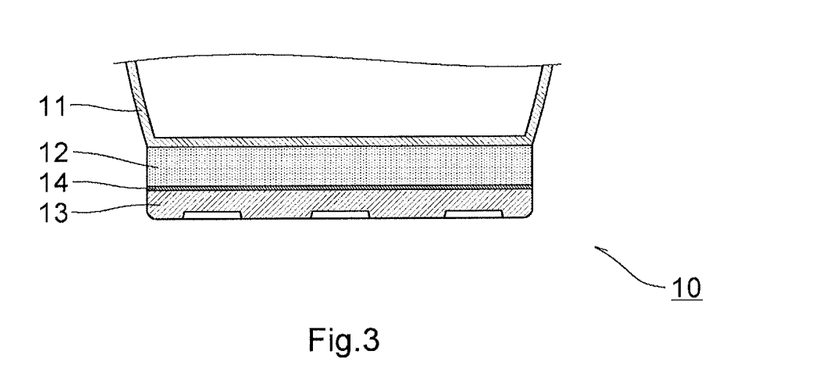
FIG. 3 is a cross-sectional view cut along line of FIG. 2.

FIG. 2 and FIG. 3 shows one embodiment of a shoe.

In FIG. 2 and FIG. 3, a shoe 10 is, for example, a sports shoe. The shoe 10 has a main body 11 covering an in step and the like, a midsole 12 provided below the main body 11, and an outersole 13 provided below the midsole 12. Between the midsole 12 and the outersole 13, an adhesive layer 14 is provided. The midsole 12 and the outersole 13 are bonded with the adhesive layer 14 interposed therebetween.

In the shoes shown in FIGS. 2 and 3, the midsole 12 is formed with the adherend 3, the outersole 13 is formed with the rubber member 1, and the adhesive layer 14 is formed with the melt adhesive sheet 2.

The melt adhesive sheet is a material that can be melted by laser light, and is formed from a material that can be bonded to both the rubber member and the adherend. Examples of the forming material of the melt adhesive sheet include compositions containing a polymer material and an absorbent. The absorbent refers to an agent which, when added, can increase the laser absorptivity.

Examples of the polymer material include polymer materials which are used as a main ingredient of a hot-melt adhesive or the like (for example, thermoplastic resins, thermoplastic elastomers, rubbers, and the like). Examples of the thermoplastic resin include, for example, olefin-based resins such as low density polyethylene, high density polyethylene, polypropylene, ethylene-vinyl acetate copolymers (EVA), and ethylene-α olefin copolymers; ester-based resins such as polyethylene terephthalate and polybutylene terephthalate; styrene-based resins such as polystyrene, AS resins and ABS resins; amide-based resins such as 6-nylon; vinyl chloride-based resins; acryl-based resins such as polymethylmethacrylate; vinyl acetate-based resins; and the like. These may be used alone or in combination of two or more kinds.

Examples of the thermoplastic elastomer include olefin-based elastomers, styrene-based elastomers, urethane-based elastomers, ester-based elastomers, fluorine-based elastomers, silicone-based elastomers, polyamide-based elastomers, and the like. These are used alone or in combination of two or more kinds.

For specific examples of the rubber, see the passage of the rubber ingredients as they are as described therein.

The melt adhesive sheet preferably has an excellent flexibility even after the rubber member and the adherend are bonded together. Such a melt adhesive sheet can be formed by using an olefin-based polymer or an olefin-based elastomer.

Examples of the absorbent include, for example, inorganic pigments such as carbon black and oxide-based pigments; organic pigments such as phthalocyanine-based pigments, lake pigments, and polycyclic pigments; dyes having an absorption wavelength appropriate for laser light used; and the like. The blended amount of the absorbent is not particularly limited, but is normally 0.1% by mass to 3% by mass based on the total amount of the melt adhesive sheet.

The thickness of the melt adhesive sheet is not particularly limited. If the melt adhesive sheet is too thin, the rubber member and the adherend may not be sufficiently bonded together with the melt adhesive sheet interposed therebetween. From this point of view, the thickness of the melt adhesive sheet is preferably 10 μm or more.

Examples of the forming material of the adherent include known thermoplastic resins, thermoplastic elastomers, rubbers, and the like. For specific examples of thermoplastic resins, thermoplastic elastomers, and rubbers, see the passage of the melt adhesive sheet and the rubber member described above as they are as described therein.

The main ingredient of the adherend is preferably identical to or of the same kind as the main ingredient of the melt adhesive sheet described above. If both ingredients (for example, polymer materials) are identical to or of the same kind, the adherend and the melt adhesive sheet may be strongly bonded.

For the adherend, a non-foamed adherend is normally used, but a foamed adherend may also be used as required.

If the adherend is melted during irradiation of laser light and the molten adherend can be directly bonded to the rubber member, it is also possible to exclude the melt adhesive sheet. For example, if the rubber member is an outersole of a shoe, the adherend is a midsole.

The wavelength of laser light applied is 780 nm to 1000 nm. Generally, laser light having a wavelength of 808 nm is used. The irradiation speed of laser light is preferably 3 mm/sec to 15 mm/sec. The output of laser light is preferably total 100 W to 625 W with 4 to 25 diodes each of 10 W to 25 W.

The rubber member of the present invention has a laser light transmittance of 30% or more, and preferably 50% or more. Thus, the rubber member of the present invention has an excellent laser light transmittance, and therefore a greater amount of laser light transmits through the rubber member. Consequently, a greater amount of laser light reaches the melt adhesive sheet or the adherend through the rubber member. A greater amount of laser light reaching the melt adhesive sheet or the adherend allows the rubber member and the adherend to bond together in good condition.

The use of a rubber member having an excellent laser light transmittance can reduce a period of time for irradiation of laser light for obtaining a desired bonding strength. Accordingly, the efficiency of bonding operations can be improved.

EXAMPLE

The present invention will be further described in detail below with reference to Examples and Comparative Examples. Here, the present invention is not limited only to the following Examples.

[Materials used for Examples and Comparative Examples]
(1) Butadiene rubber: product name "Nipol BR 1220" manufactured by ZEON Corporation. Molecular weight: about 430000.
(2) Styrene butadiene rubber: product name "Asaprene 303" manufactured by Asahi Kasei Corporation. Molecular weight: about 170000.
(3) Isoprene rubber: product name "Nipol IR 2200" manufactured by ZEON Corporation. Molecular weight: about 1750000.

(4) Silica 1: dry silica having an average particle size of 12 nm and a refractive index of 1.45 (product name "Aerosil 200V" manufactured by Nippon Aerosil Co., Ltd.).
(5) Silica 2: wet silica having an average particle size of 16 nm and a refractive index of 1.45 (product name "Ultrasil VN3XR" manufactured by DEGUSSA).
(6) Silica 3: dry silica having an average particle size of 100 nm and a refractive index of 1.43 (product name "Seahoster KE-P10" manufactured by Nippon Shokubai Co., Ltd.).
(7) Silica 4: dry silica having an average particle size of 500 nm and a refractive index of 1.43 (product name "Seahoster KE-P50" manufactured by Nippon Shokubai Co., Ltd.).
(8) Silica 5: dry silica having an average particle size of 1000 nm and a refractive index of 1.43 (product name "Seahoster KE-P100" manufactured by Nippon Shokubai Co., Ltd.).
(9) Silica 6: dry silica having an average particle size of 1500 nm and a refractive index of 1.43 (product name "Seahoster KE-P150" manufactured by Nippon Shokubai Co., Ltd.).
(10) Crosslinker: dicumyl peroxide.
(11) Zinc oxide: zinc oxide having an average particle size of 400 to 700 and a refractive index of 1.95 (product name "Zinc Oxide 1" manufactured by Seido Chemical Industry Co., Ltd.).
(12) Softener: process oil (product name "Process Oil P-200" manufactured by Japan Energy Corporation).

[Method for Measuring Average Particle Size]

The average particle sizes of silica and zinc oxide were measured by using a laser diffraction particle size distribution measuring device (product name "SK Laser Micron sizer LMS-2000e" manufactured by SEISHIN ENTERPRISE Co., Ltd.). The average particle size is an average for three samples.

[Method for Measuring Laser Light Transmittance]

The laser light transmittance was measured at 23° C. by using a laser power meter (product name "NOVA II" manufactured by Ophir Optoronics Ltd.) while irradiating one surface of a specimen (sheet having a thickness of 2 mm) with laser light having a wavelength of 808 nm in the normal direction.

[Method for Measuring Hardness]

The hardness was measured by the following method in accordance with JIS K 6253.

With a spring hardness tester type A, the pressing surface of the tester was brought into contact with a specimen having a thickness of 12 mm or more (a plurality of specimens were stacked into a thickness of 12 mm or more) such that a pressing needle of the tester was perpendicular to the measurement surface of the specimen, and the pressing needle was pressed against the specimen under a load of 9.81 N, followed by immediately reading the scale.

[Method for Measuring Specific Gravity]

The specific gravity was measured by the following method in accordance with JIS K 6268.

The weights of the specimen in air and water were measured, respectively, by using an electronic balance, and measurements were substituted for the following equation to thereby calculate a specific gravity.

$$D=W_1(W_1/W_2)$$

D: specific gravity
$W_1$: weight of specimen in air
$W_2$: weight of specimen in water

[Method for Measuring Tensile Strength]

The tensile strength was measured by the following method in accordance with JIS K 6251.

With a tensile tester (product name "STROGRAPH-R2" manufactured by Toyo Seiki Seisaku-Sho, Ltd.), opposite ends of a specimen of Dumbbell No. 2 specified in JIS K 6251 were held by chucks of the tester and continuously drawn at a speed of 500 mm/min until the specimen was ruptured. The tensile strength was calculated from a load at which the specimen was ruptured and a cross section of a clamped area before drawing.

[Method for Measuring Elongation]

The elongation was measured by the following method in accordance with JIS K 6251.

With a tensile tester (product name "STROGRAPH-R2" manufactured by Toyo Seiki Seisaku-Sho, Ltd.), the clamped area of a specimen of Dumbbell No. 2 specified in JIS K 6251 was given index marks at intervals of 20 mm, and opposite ends of the specimen were held by chucks of the tester and continuously drawn at a speed of 500 mm/min until the specimen was ruptured. The elongation was calculated from a distance between index marks at which the specimen was ruptured and a distance between index marks before drawing (20 mm).

[Method for Measuring Tear Strength]

The tear strength was measured by the following method in accordance with JIS K 6252.

With a tensile tester (product name "STROGRAPH-R2" manufactured by Toyo Seiki Seisaku-Sho, Ltd.), opposite ends of a specimen of Angle type specified in JIS K 6252 were held by chucks of the tester and continuously drawn at a speed of 500 mm/min until the specimen was ruptured. The tear strength was calculated from a load at which the specimen was ruptured and a thickness of the specimen before drawing.

Example 1

The materials were blended at the ratio shown in the composition in Table 1, and mixed at 80° C. by using a kneader (Model DSS-10 MWB-E) to thereby obtain a mixture.

Next, the mixture was pressed at 160° C. under a pressure of about 14.7 MPa for about 20 minutes by using a pressing machine to prepare a sheet having a thickness of 2 mm. Further, the sheet was shaped to have a longitudinal length of 50 mm and a lateral length of 20 mm.

The laser light transmittance of the sheet was measured. The results are shown in Table 1.

In the composition in Table 1, the unit of the blended amount of each material is part by mass (the same applies to Tables 2 to 4 and 6).

Examples 2 to 15

Sheets having a thickness of 2 mm were prepared in the same manner as in Example 1 except that the materials were blended at the ratio shown in the compositions in Tables 1 to 3. The laser light transmission of each sheet was measured. The results are shown in those Tables.

Comparative Examples 1 to 3

Sheets having a thickness of 2 mm were prepared in the same manner as in Example 1 except that the materials were blended at the ratio shown in the compositions in Table 3. The laser light transmission of each sheet was measured. The results are shown in Table 3.

TABLE 1

| composition | Example 1 | Example 2 | Example 3 | Example 4 | Example 5 | Example 6 |
|---|---|---|---|---|---|---|
| Butadiene Rubber | 100 | 100 | 100 | 100 | 100 | 100 |
| Silica 1 (average particle size: 12 nm) | 10 | 30 | 50 | | | |
| Silica 2 (average particle size: 16 nm) | | | | 10 | 30 | 50 |
| Silica 3 (average particle size: 100 nm) | | | | | | |
| Silica 4 (average particle size: 500 nm) | | | | | | |
| Silica 5 (average particle size: 1000 nm) | | | | | | |
| Silica 6 (average particle size: 1500 nm) | | | | | | |
| Crosslinker (Dicumyl Peroxide) | 0.25 | 0.25 | 0.25 | 0.25 | 0.25 | 0.25 |
| Stearic Acid | 1 | 1 | 1 | 1 | 1 | 1 |
| Zinc Oxide | | | | | | |
| Softener | 6 | 6 | 6 | 6 | 6 | 6 |
| Laser Light Transmittance (%) | 85 | 80 | 86 | 70 | 66 | 68 |

TABLE 2

| composition | Example 7 | Example 8 | Example 9 | Example 10 | Example 11 | Example 12 |
|---|---|---|---|---|---|---|
| Butadiene Rubber | 100 | 100 | 100 | 100 | 100 | 100 |
| Silica 1 (average particle size: 12 nm) | | | | | | |
| Silica 2 (average particle size: 16 nm) | | | | 15 | 25 | 30 |
| Silica 3 (average particle size: 100 nm) | 10 | 30 | 50 | 15 | 25 | |
| Silica 4 (average particle size: 500 nm) | | | | | | |
| Silica 5 (average particle size: 1000 nm) | | | | | | |
| Silica 6 (average particle size: 1500 nm) | | | | | | |
| Crosslinker (Dicumyl Peroxide) | 0.25 | 0.25 | 0.25 | 0.25 | 0.25 | 0.25 |
| Stearic Acid | 1 | 1 | 1 | 1 | 1 | 1 |
| Zinc Oxide | | | | | | 0.1 |
| Softener | 6 | 6 | 6 | 6 | 6 | 6 |
| Laser Light Transmittance (%) | 50 | 34 | 32 | 51 | 53 | 66 |

TABLE 3

| composition | Example 13 | Example 14 | Example 15 | Comparative Example 1 | Comparative Example 2 | Comparative Example 3 |
|---|---|---|---|---|---|---|
| Butadiene Rubber | 100 | 100 | 100 | 100 | 100 | 100 |
| Silica 1 (average particle size: 12 nm) | | | | | | |
| Silica 2 (average particle size: 16 nm) | 30 | 30 | 30 | | | |
| Silica 3 (average particle size: 100 nm) | | | | | | |
| Silica 4 (average particle size: 500 nm) | | | | 30 | | |
| Silica 5 (average particle size: 1000 nm) | | | | | 30 | |
| Silica 6 (average particle size: 1500 nm) | | | | | | 30 |
| Crosslinker (Dicumyl Peroxide) | 0.25 | 0.25 | 0.25 | 0.25 | 0.25 | 0.25 |
| Stearic Acid | 1 | 1 | 1 | 1 | 1 | 1 |
| Zinc Oxide | 0.4 | 0.8 | 3 | | | |
| Softener | 6 | 6 | 6 | 6 | 6 | 6 |
| Laser Light Transmittance (%) | 60 | 50 | 30 | 22 | 25 | 24 |

The results from Examples 1 to 6 show that when using silica having average particle sizes of 12 nm and 16 nm, the laser light transmittance is almost the same even though their blended amounts are varied. The results from Examples 7 to 9 show that the laser light transmittance decreases as the blended amount of silica having an average particle size of 100 nm is increased. From these results, it is concluded that when using silica having an average particle size of 50 nm or less, a rubber member having a laser light transmittance of 30% or more can be obtained if the amount of the silica is 100 parts by mass or less based on 100 parts by mass of the rubber ingredient. Also, it is estimated that when using silica having an average particle size of more than 50 nm and 120 nm or less, a rubber member having a laser light transmittance of 30% or more can be obtained if the amount of the silica is 50 parts by mass or less based on 100 parts by mass of the rubber ingredient.

The results from Examples 7 to 11 show that when combining silica having an average particle size of 100 nm and silica having an average particle size of 16 nm, the laser light transmittance is improved as compared to the case where silica having an average particle size of 100 nm is used alone. From these results, it is estimated that silica having an average particle size of 50 nm or less acts to improve the laser light transmittance. Therefore, when using silica having an average particle size of more than 50 nm and 120 nm or less, it is preferable to mix silica having an average particle size of 50 nm or less.

Further, results from Examples 12 to 15 show that the laser light transmittance decreases as the blended amount of zinc oxide is increased. From these results, it is concluded that when the zinc oxide is blended, a rubber member having a laser light transmittance of 30% or more can be obtained if the amount of the zinc oxide is 3 parts by mass or less.

Examples 16 to 20

Sheets having a thickness of 2 mm were prepared in the same manner as in Example 1 except that the materials were blended at the ratio shown in the compositions in Table 4. The laser light transmission of each sheet was measured. The results are shown in Table 4.

TABLE 4

| composition | Example 16 | Example 17 | Example 18 | Example 19 | Example 20 |
|---|---|---|---|---|---|
| Butadiene Rubber | | | 50 | 70 | 30 |
| Styrene-Butadiene Rubber | 100 | | | | |
| Isoprene Rubber | | 100 | 50 | 30 | 70 |
| Silica 1 (average particle size: 12 nm) | 30 | 30 | 30 | 30 | 30 |
| Crosslinker (DicumylPeroxide) | 0.25 | 0.5 | 0.4 | 0.35 | 0.45 |
| Stearic Acid | 1 | 1 | 1 | 1 | 1 |
| Softener | 6 | 6 | 6 | 6 | 6 |
| Laser Light Transmittance (%) | 57 | 73 | 77 | 72 | 75 |

The results from Examples 16 to 20 show that when the rubber ingredient other than butadiene rubber or two kinds of rubber ingredients is(are) used, a rubber member having a laser light transmittance of 30% or more can be obtained.

Next, the mechanical strengths of rubber sheets of Examples 2, 5, 8, 15, 16 and 18 were measured. The results are shown in Table 5. All the sheets had a mechanical strength required as a component of a shoe.

TABLE 5

| | Example 2 | Example 5 | Example 8 | Example 15 | Example 16 | Example 18 |
|---|---|---|---|---|---|---|
| Hardness | 53 | 74 | 54 | 54 | 55 | 38 |
| Specific Gravity | 1.04 | 1.04 | 1.03 | 1.05 | 1.11 | 1.04 |
| Tensile Strength (kgf/cm 2) | 78 | 49 | 25 | 63 | 102 | 123 |
| Elongation (%) | 510 | 330 | 450 | 450 | 650 | 650 |
| Tear Strength (kgf/cm) | 28 | 30 | 21 | 26 | 37 | 28 |

Example 21 and Reference Examples 1 and 2

Sheets having a thickness of 2 mm were prepared in the same manner as in Example 1 except that the materials were blended at the ratio shown in the compositions in Table 6. The laser light transmission of each sheet was measured. The results are shown in Table 6.

TABLE 6

| | Example 21 | Reference Example 1 | Reference Example 2 |
|---|---|---|---|
| Butadiene Rubber | 100 | 100 | 100 |
| Silica 2 (average particle size: 16 nm) | 30 | 30 | 50 |
| Crosslinker (DicumylPeroxide) | 0.25 | 0.25 | 0.25 |
| Stearic Acid | 1 | 1 | 1 |
| Titanium Oxide | 0.1 | 0.5 | 1 |
| Softener | 6 | 6 | 6 |
| Laser Light Transmittance (%) | 50 | 22 | 18 |

[Laser Bonding]

A laminate having three-layer structure was formed by laminating the sheet of Example 5 (hereinafter, referred to as rubber member), the following melt adhesive sheet, and the following adherend in this order. The laminate is a laminate as shown in FIG. 1.

(Melt Adhesive Sheet)

A mixture of 50 parts by mass of ethylene-vinyl acetate copolymer (product name "ULTRASEN 631" manufactured by Tosoh Corporation; vinyl acetate content 20%), 50 parts by mass of syndiotactic 1,2-polybutadiene (product name "RB 830" manufactured by JSR Corporation; 1,2-bond content: 93%; MFR: 3; melting point: 105° C.; specific gravity: 0.91), and 0.1 part by mass of infrared ray absorbent dye (product name "Lumogen IR 788" manufactured by BASF Japan Ltd.) was kneaded by a twin-screw kneader, and then formed into a sheet by extrusion molding. The sheet was used as a melt adhesive sheet. The sheet had a thickness of 200 μm, a longitudinal length of 50 mm and a lateral length of 20 mm.

(Adherend)

A mixture of 100 parts by mass of ethylene-vinyl acetate copolymer (product name "ULTRASEN 631" manufactured by Tosoh Corporation; vinyl acetate content 20%), 3 parts by mass of a foaming agent (product name "AC #3C-K2" manufactured by EIWA CHEMICAL IND. CO., LTD.), 0.6 part by mass of a crosslinker (product name "PERCUMYL D" manufactured by NOF CORPORATION), 0.5 part by mass of a crosslinking aid (stearic acid manufactured by New Japan Chemical Co., Ltd.) and, 1.5 parts by mass of zinc oxide (product name "Active Zinc Oxide No. 2" manufactured by Honjo Chemical Corporation) was kneaded by using a kneader. Then, the resulting product was pressed at 160° C. at a pressure of 15 MPa for about 20 minutes by using a pressing machine to thereby form a foam. This foam was used as an adherend. The density of the foam was 0.20 g/cm$^3$. The foam had a thickness of 4 mm, a longitudinal length of 50 mm and a lateral length of 20 mm.

Laser light having a wavelength of 808 nm was applied from above the rubber member of the laminate by using a laser irradiation apparatus (manufactured by Emerson Japan, Ltd.) (See FIG. 1).

Laser light irradiation conditions are shown in Table 7. However, the irradiation time in table 7 is a converted value for a pair of shoes (longitudinal length 300 mm). Specifically, irradiation time was calculated from equation: irradiation time=300 (mm)/laser irradiation speed (mm/sec).

After irradiation of laser light under the aforementioned conditions, the laminate was examined, and it was found that the rubber member of Example 5 and the adherend were bonded together with the melt adhesive sheet interposed therebetween.

For examining the strength of bonding between the rubber member and the adherend for the laminate after laser irradiation, the following delamination test was conducted.

The edge of the rubber member and the edge of the adherend were held by respective chucks of the tensile tester, and both the chucks were moved away from each other to thereby delaminate the sheet and the foam at a 180° angle (in other words, the edge of the sheet and the edge of the foam were drawn so as to break away in the direction of about 180° angle).

The peel strength at the time of delamination was read from the tensile tester. The results are shown in Table 7.

For the sheets (rubber members) of Example 21 and Reference Examples 1 and 2, similarly a laminate was prepared, laser bonding was performed and the peel strength was measured. The results are shown in Table 7.

TABLE 7

|  | Laser Light Irradiation Conditions | | | | Peel Strength (kgf/2 cm) |
| --- | --- | --- | --- | --- | --- |
|  | Laser Light Transmittance (%) | Output | Irradiation Speed (mm/sec) | Irradiation Time (sec) |  |
| Example 5 | 66 | 300 | 5 | 60 | 4.5 |
| Example 21 | 50 | 300 | 5 | 60 | 3.6 |
| Reference Example 1 | 22 | 300 | 5 | 60 | 0.1 |
| Reference Example 2 | 18 | 300 | 5 | 60 | 0.1 |

INDUSTRIAL APPLICABILITY

The rubber member for laser bonding of the present invention may be used for a product having a rubber portion such as a shoe, a sports product, and the like.

REFERENCE SIGNS LIST 1 rubber member for laser bonding
2 melt adhesive sheet
3 adherend for laser bonding
5 laminate
10 shoe
11 main body of shoe
12 midsole of shoe
13 outersole of shoe

What is claimed is:

1. A laser-bonding rubber shoe member, comprising:
a rubber ingredient, silica, a zinc oxide, and a crosslinker, wherein:
    the silica includes a first silica having an average particle size of more than 50 nm and 120 nm or less and second silica having an average particle size of 10 nm to 30 nm,
    the amount of the first silica having an average particle size of more than 50 nm and 120 nm or less is 10 parts by mass to 30 parts by mass based on 100 parts by mass of the rubber ingredient,
    the rubber shoe member is absent carbon black,
    the amount of the second silica having an average particle size of 10 nm to 30 nm is 10 parts by mass to 30 parts by mass based on 100 parts by mass of the rubber ingredient,
    the rubber ingredient is crosslinked by the crosslinker,
    the amount of the zinc oxide is 1 part by mass or less based on 100 parts by mass of the rubber ingredient, and
    the rubber shoe member has a laser light transmittance of at least 30%, in which the laser light transmittance is a transmittance when the rubber shoe member has a thickness of 2 mm and is irradiated with laser light having a wavelength of 808 nm.

2. The laser-bonding rubber shoe member according to claim 1, the amount of the crosslinker being 0.5 part by mass to 5 parts by mass based on 100 parts by mass of the rubber ingredient.

3. The laser-bonding rubber shoe member according to claim 1, wherein the refractive index of the silica is 1.5 or less.

4. The laser-bonding rubber shoe member according to claim 1, wherein the zinc oxide is used as a crosslinking promoter.

5. A shoe comprising the rubber member for laser bonding according to claim 1.

* * * * *